(12) United States Patent
Lee et al.

(10) Patent No.: US 9,223,732 B2
(45) Date of Patent: Dec. 29, 2015

(54) APPARATUS AND METHOD OF RECOGNIZING EXTERNAL DEVICE IN A COMMUNICATION SYSTEM

(71) Applicant: Samsung Electronics Co., Ltd., Suwon-si, Gyeonggi-do (KR)

(72) Inventors: Woo-Kwang Lee, Suwon-si (KR); One-Gun Lee, Seoul (KR); Kyoung-Hoon Kim, Seoul (KR); Jong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/254,425

(22) Filed: Apr. 16, 2014

(65) Prior Publication Data

US 2014/0351458 A1  Nov. 27, 2014

(30) Foreign Application Priority Data

May 21, 2013  (KR) ........................ 10-2013-0057279

(51) Int. Cl.
*G06F 3/00* (2006.01)
*G06Q 30/00* (2012.01)
*G06F 13/38* (2006.01)

(52) U.S. Cl.
CPC .................................... *G06F 13/385* (2013.01)

(58) Field of Classification Search
CPC ........................ H04N 21/42207; G06F 13/385
See application file for complete search history.

(56) References Cited

U.S. PATENT DOCUMENTS

| 7,865,629 B1 | 1/2011 | Tantos et al. |
| 8,176,214 B2 | 5/2012 | Jones et al. |
| 8,275,914 B2 | 9/2012 | Kim et al. |
| 2009/0061678 A1* | 3/2009 | Minoo et al. .................. 439/502 |
| 2011/0125601 A1* | 5/2011 | Carpenter et al. ........... 705/26.1 |
| 2011/0294359 A1 | 12/2011 | Cho et al. |
| 2013/0009864 A1 | 1/2013 | Jeong |
| 2014/0177878 A1* | 6/2014 | Hung et al. ................... 381/123 |

FOREIGN PATENT DOCUMENTS

| KR | 10-2011-0129809 A | 12/2011 |
| KR | 10-1187269 B1 | 10/2012 |
| KR | 10-2013-0006031 A | 1/2013 |

* cited by examiner

*Primary Examiner* — Hyun Nam
(74) *Attorney, Agent, or Firm* — Jefferson IP Law, LLP

(57) ABSTRACT

An apparatus and a method of recognizing an external device in a portable terminal are provided. The apparatus includes a connector connected to the external device, and a controller configured to transmit a connection message, if the portable terminal is connected to the external device through the connector, the connection message asking whether the external device supports a second connection scheme to the external device by using a first connection scheme, configured to receive a connection response message as a response to the connection message from the external device, configured to determine based on the connection response message whether the external device supports the second connection scheme, and configured to recognize at least one device supporting the second connection scheme in the external device by activating the second connection scheme, if the external device supports the second connection scheme.

19 Claims, 13 Drawing Sheets

FIG.2 (RELATED ART)

| ADC Value | | | | | | ADC Low | ADC 1K | ID Resistor | Description |
|---|---|---|---|---|---|---|---|---|---|
| Hex | 4 | 3 | 2 | 1 | 0 | | | | |
| 0x00 | 0 | 0 | 0 | 0 | 0 | 0 | 0 | GND | USB OTG |
| any | | | | | | 1 | 0 | 75 ohms | Audio Video Cable with load |
| 0x01 | 0 | 0 | 0 | 0 | 1 | 1 | 0 | 1K | MHL Cable |
| 0x02 | 0 | 0 | 0 | 1 | 0 | 1 | 0 | 2K | SEND/END Button |
| 0x03 | 0 | 0 | 0 | 1 | 1 | 1 | 0 | 2.604K | Remote S1 Button |
| 0x04 | 0 | 0 | 1 | 0 | 0 | 1 | 0 | 3.208K | Remote S2 Button |
| 0x05 | 0 | 0 | 1 | 0 | 1 | 1 | 0 | 4.014K | Remote S3 Button |
| 0x06 | 0 | 0 | 1 | 1 | 0 | 1 | 0 | 4.82K | Remote S4 Button |
| 0x07 | 0 | 0 | 1 | 1 | 1 | 1 | 0 | 6.03K | Remote S5 Button |
| 0x08 | 0 | 1 | 0 | 0 | 0 | 1 | 0 | 8.03K | Remote S6 Button |
| 0x09 | 0 | 1 | 0 | 0 | 1 | 1 | 0 | 10.03K | Remote S7 Button |
| 0x0A | 0 | 1 | 0 | 1 | 0 | 1 | 0 | 12.03K | Remote S8 Button |
| 0x0B | 0 | 1 | 0 | 1 | 1 | 1 | 0 | 14.46K | Remote S9 Button |
| 0x0C | 0 | 1 | 1 | 0 | 0 | 1 | 0 | 17.26K | Remote S10 Button |
| 0x0D | 0 | 1 | 1 | 0 | 1 | 1 | 0 | 20.5K | Remote S11 Button |
| 0x0E | 0 | 1 | 1 | 1 | 0 | 1 | 0 | 24.07K | Remote S12 Button |
| 0x0F | 0 | 1 | 1 | 1 | 1 | 1 | 0 | 28.7K | Reserved Accessory 1 |
| 0x10 | 1 | 0 | 0 | 0 | 0 | 1 | 0 | 34K | Reserved Accessory 2 |
| 0x11 | 1 | 0 | 0 | 0 | 1 | 1 | 0 | 40.2K | Reserved Accessory 3 |
| 0x12 | 1 | 0 | 0 | 1 | 0 | 1 | 0 | 49.9K | Reserved Accessory 4 |
| 0x13 | 1 | 0 | 0 | 1 | 1 | 1 | 0 | 64.9K | Reserved Accessory 5 |
| 0x14 | 1 | 0 | 1 | 0 | 0 | 1 | 0 | 80.07K | CEA936 Audio Mode |
| 0x15 | 1 | 0 | 1 | 0 | 1 | 1 | 0 | 102K | Phone Powered Device |
| 0x16 | 1 | 0 | 1 | 1 | 0 | 1 | 0 | 121K | TTY Converter |
| 0x17 | 1 | 0 | 1 | 1 | 1 | 1 | 0 | 150K | UART Cable |
| 0x18 | 1 | 1 | 0 | 0 | 0 | 1 | 0 | 200K | CEA-936A Type 1 Charger |
| 0x19 | 1 | 1 | 0 | 0 | 1 | 1 | 0 | 255K | Factory Mode USB |
| 0x1A | 1 | 1 | 0 | 1 | 0 | 1 | 0 | 301K | Factory Mode USB |
| 0x1B | 1 | 1 | 0 | 1 | 1 | 1 | 0 | 365K | Audio Video Cable with no load |
| 0x1C | 1 | 1 | 1 | 0 | 0 | 1 | 0 | 442K | CEA-936A Type 2 Charger |
| 0x1D | 1 | 1 | 1 | 0 | 1 | 1 | 0 | 523K | Factory Mode UART |
| 0x1E | 1 | 1 | 1 | 1 | 0 | 1 | 0 | 619K | Factory Mode UART |
| 0x1F | 1 | 1 | 1 | 1 | 1 | 1 | 0 | 1000K | Audio Mode with Remote |
| | | | | | | 1 | 1 | Open | USB, Dedicated Charger or Accessory removal |

APPARATUS AND METHOD OF RECOGNIZING EXTERNAL DEVICE IN A COMMUNICATION SYSTEM

CROSS-REFERENCE TO RELATED APPLICATION(S)

This application claims the benefit under 35 U.S.C. §119(a) of a Korean patent application filed on May 21, 2013 in the Korean Intellectual Property Office and assigned Serial No. 10-2013-0057279, the entire disclosure of which is hereby incorporated by reference.

TECHNICAL FIELD

The present disclosure relates to a communication system. More particularly, the present disclosure relates to an apparatus and method of recognizing an external device in a communication system.

BACKGROUND

Portable terminals, such as smartphones and tablets, provide a variety of useful functions to users through a lot of applications. Therefore, the portable terminals are evolving toward devices that provide various types of information, in addition to voice call information, via various functions. Such a portable terminal is connected to an external device and outputs data to the external device or receives data from the external device by a data Input/Output (I/O) function.

To provide the data I/O function, the portable terminal and the external device should be connected in a specific connection scheme, such as Universal Serial Bus (USB) connectivity and Mobile High-Definition Link (MHL) connectivity. If the external device supports MHL connectivity and USB connectivity, the portable terminal recognizes a USB device of the external device based on a resistance of a USB IDentifier (ID) pin.

However, since USB ID pins are limited resources, ACcessory Detection (ACD) values corresponding to the resistance values of the USB ID pins cannot be defined for all supported accessories. As a consequence, a portable terminal recognizes only a limited number of external devices, and may not recognize all external devices supporting USB connectivity.

FIG. 1 illustrates a configuration of a communication system according to the related art.

Referring to FIG. 1, the communication system includes a portable terminal 101 and an external device 103. When the external device 103 is connected to the portable terminal 101 via a Universal Serial Bus (USB) cable 105, the external device 103 provides its specific function to the portable terminal 101. The external device 103 is called an accessory and may be any of a TeleVision (TV), a monitor, a beam projector, a keyboard, a touch screen, a Personal Computer (PC), an audio player, an auxiliary battery, and any other similar and/or suitable electronic device. For example, if the external device 103 is a TV, then the external device 103 may provide a multimedia play function of receiving multimedia data from the portable terminal 101 and displaying the received multimedia data.

When the portable terminal 101 is connected to the external device 103 via the USB cable 105, the portable terminal 101 measures a resistance of a pin corresponding to a USB IDentifier (ID), from among a plurality of pins included in a connector of the portable terminal 101. The portable terminal 101 determines the external device 103 based on the measured resistance, referring to a table tabulating ACcessory Detection (ADC) values with respect to predetermined resistance values of USB IDs. Then the portable terminal 101 recognizes the external device 103 by performing a USB host function.

The USB host function refers to a function that enables operation between portable terminals such as a Personal Digital Assistant (PDA), an MP3 player, and a portable phone, without intervention of a main computer. For example, the USB host function may include a data exchange function between the portable terminal 101 and the external device 103, and a battery charging function of the portable terminal 101, when the external device 103 is an auxiliary battery.

FIG. 2 is a table that tabulates ADC values versus the resistance values of USB ID pins according to the related art.

Referring to FIG. 2, a table 201 that tabulates ADC values versus the resistance values of USB ID pins includes ADC values 203 allocated to a plurality of accessories. For example, if a USB ID resistance is 28.7 K$\Omega$, the portable terminal 101 may detect an ADC value of 0x0E mapped to the USB ID resistance 28.7 K$\Omega$. If determining that the external device 103 corresponds to Accessory 1 mapped to the ADC value 0x0E, then the portable terminal 101 may recognize the external device 103 by performing the USB host function.

However, since USB ID pins are limited resources, ADC values corresponding to the resistance values of USB ID pins cannot be defined for all supported accessories. Consequently, the portable terminal 101 may recognize a limited number of accessories, because not all accessories support USB connectivity. For example, the portable terminal 101 may recognize only five types of accessories 203 preset in the table 201 listing ADC values versus the resistance values of USB ID pins, and thus, may not recognize other types of accessories.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method of recognizing all external devices supporting Universal Serial Bus (USB) connectivity in a communication system.

Another aspect of the present disclosure is to provide an apparatus and method of recognizing all external devices supporting USB connectivity using Mobile High-Definition Link (MHL) connectivity in a communication system.

Another aspect of the present disclosure is to provide an apparatus and method of recognizing all external devices supporting USB connectivity using a Control BUS (CBUS) line, from among MHL lines, in a communication system.

In accordance with an aspect of the present disclosure, an apparatus of recognizing an external device in a portable terminal is provided. The apparatus includes a connector connected to the external device, and a controller configured to transmit a connection message, if the portable terminal is connected to the external device through the connector, the connection message asking whether the external device supports a second connection scheme to the external device by using a first connection scheme, configured to receive a connection response message as a response to the connection message from the external device, configured to determine based on the connection response message whether the external device supports the second connection scheme, and configured to recognize at least one device supporting the second connection scheme in the external device by activating the second connection scheme, if the external device supports the second connection scheme.

In accordance with another aspect of the present disclosure, an apparatus of recognizing an external device in a portable terminal is provided. The apparatus includes a connector connected to the external device, and a controller configured to transmit a connection message, if the portable terminal is connected to the external device through the connector, the connection message asking whether the external device supports USB connectivity to the external device by using MHL connectivity via a CBUS line of the connector, configured to receive a connection response message as a response to the connection message from the external device via the CBUS line, configured to determine based on the connection response message whether the external device supports USB connectivity, and configured to recognize at least one USB device of the external device by executing a USB host function, if the external device supports USB connectivity.

In accordance with another aspect of the present disclosure, an apparatus of recognizing a portable terminal in an external device is provided. The apparatus includes a connector connected to the portable device, and a controller configured to receive a connection message, if the external device is connected to the portable terminal through the connector, the connection message asking whether the external device supports a second connection scheme from the portable terminal by using a first connection scheme, configured to generate a connection response message indicating whether the external device supports the second connection scheme as a response to the connection message, and configured to transmit the connection response message to the portable terminal by the first connection scheme.

In accordance with another aspect of the present disclosure, an apparatus of recognizing a portable terminal in an external device is provided. The apparatus includes a connector connected to the portable device, and a controller configured to receive a connection message, if the external device is connected to the portable terminal through the connector, the connection message asking whether the external device supports USB connectivity from the portable terminal by MHL connectivity via a CBUS line of the connector, configured to generate a connection response message indicating whether the external device supports USB connectivity as a response to the connection message, and configured to transmit the connection response message to the portable terminal via the CBUS line.

In accordance with another aspect of the present disclosure, a method of recognizing an external device in a portable terminal is provided. The method includes transmitting, if the portable terminal is connected to the external device through a connector, a connection message asking whether the external device supports a second connection scheme to the external device by using a first connection scheme, receiving a connection response message as a response to the connection message from the external device, determining based on the connection response message whether the external device supports the second connection scheme, and recognizing at least one device supporting the second connection scheme in the external device by activating the second connection scheme, if the external device supports the second connection scheme.

In accordance with another aspect of the present disclosure, a method of recognizing an external device in a portable terminal is provided. The method includes transmitting, if the portable terminal is connected to the external device through a connector, a connection message asking whether the external device supports USB connectivity to the external device by using MHL connectivity via a CBUS line of the connector, receiving a connection response message as a response to the connection message from the external device via the CBUS line, determining based on the connection response message whether the external device supports USB connectivity, and recognizing at least one USB device of the external device by executing a USB host function, if the external device supports USB connectivity.

In accordance with another aspect of the present disclosure, a method of recognizing a portable terminal in an external device is provided. The method includes receiving, if the external device is connected to the portable terminal through a connector, a connection message asking whether the external device supports a second connection scheme from the portable terminal by using a first connection scheme, generating a connection response message indicating whether the external device supports the second connection scheme as a response to the connection message, and transmitting the connection response message to the portable terminal by using the first connection scheme.

In accordance with another aspect of the present disclosure, a method of recognizing a portable terminal in an external device is provided. The method includes receiving, if the external device is connected to the portable terminal through a connector, a connection message asking whether the external device supports USB connectivity from the portable terminal by using MHL connectivity via a CBUS line of the connector, generating a connection response message indicating whether the external device supports USB connectivity as a response to the connection message, and transmitting the connection response message to the portable terminal via the CBUS line.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a table that tabulates Accessory Detection (ADC) values versus the resistance values of Universal Serial Bus (USB) IDentifier (ID) pins according to the related art;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will be provided to achieve the above-described technical aspects of the present disclosure. In an implementation, defined entities may have the same names, to which the present disclosure is not limited. Thus, various embodiments of the present disclosure can be implemented with same or ready modifications in a system having a similar technical background.

In various embodiments of the present disclosure, the term "portable terminal" refers to a portable, mobile electronic device, covering a variety of terminals including a video phone, a portable phone, a smart phone, a Wideband Code Division Multiple Access (WCDMA) phone, a Universal Mobile Telecommunication System (UMTS) terminal, a Personal Digital Assistant (PDA), a Portable Multimedia Player (PMP), a Digital Multimedia Broadcasting (DMB) terminal, an e-book reader, a portable computer, e.g., a laptop and a tablet, a digital camera, a Motion Picture Experts Group (MPEG) Audio Layer 3 (MP3) player, and any other similar and/or suitable electronic device.

Figure 1:
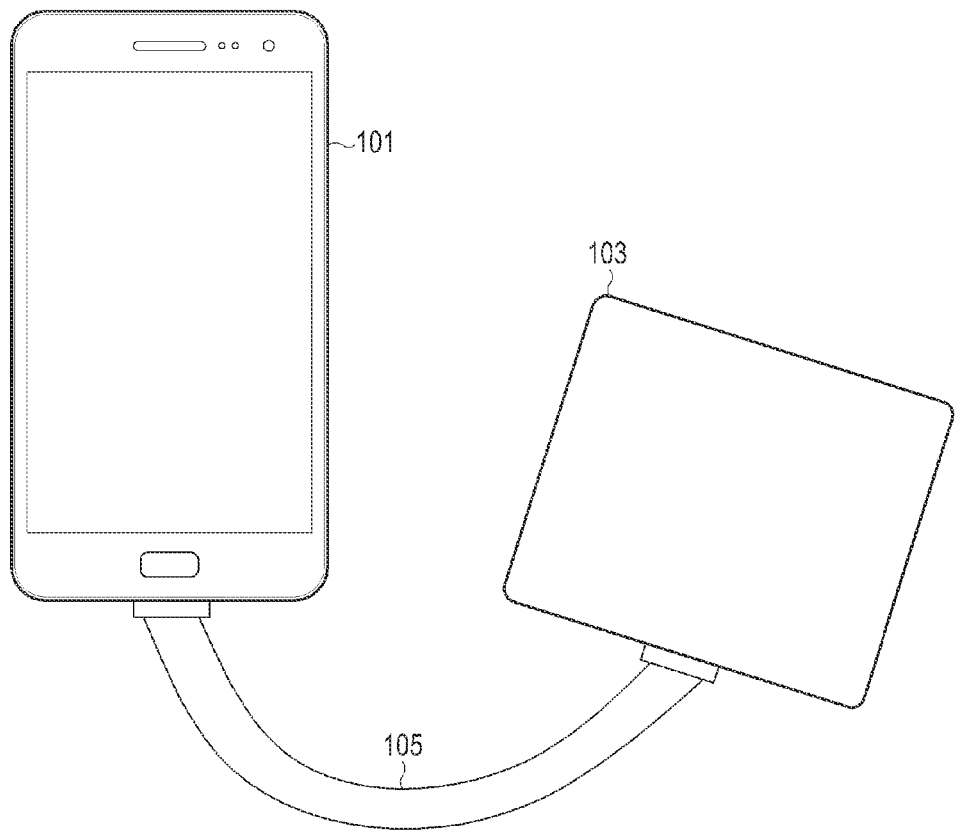
FIG. 1 illustrates a configuration of a communication system according to the related art.
Figure 3:
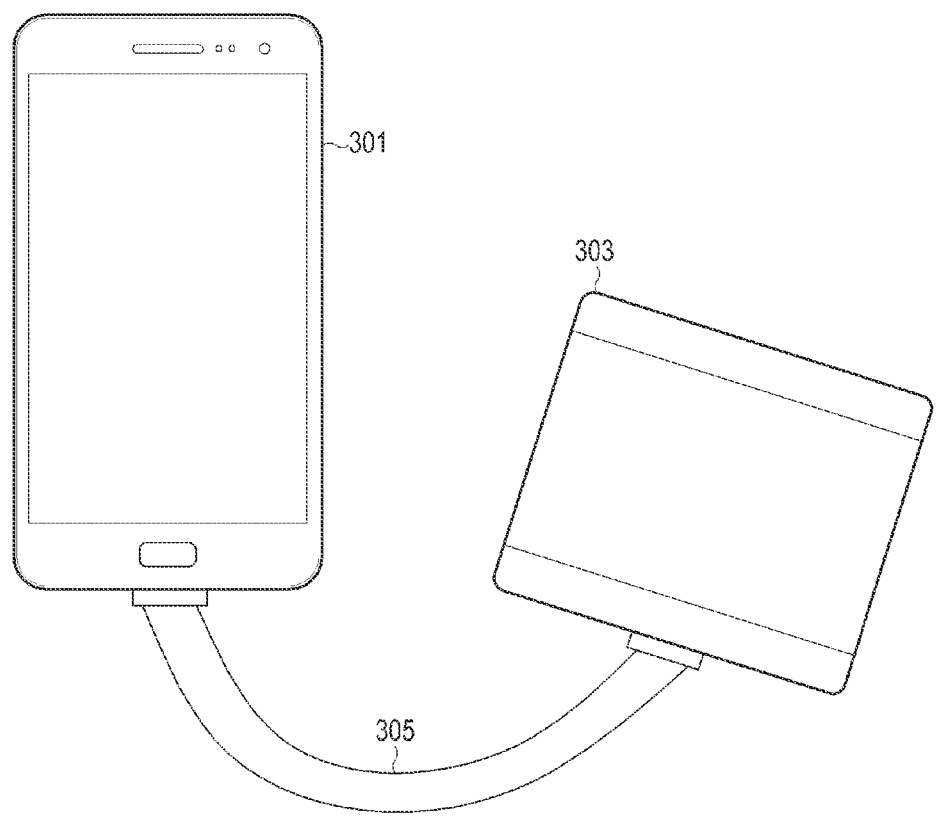
FIG. 3 illustrates a configuration of a communication system according to an embodiment of the present disclosure.

FIG. 3 illustrates a configuration of a communication system according to an embodiment of the present disclosure.

Referring to FIG. 3, the communication system includes a portable terminal 301 and an external device 303.

The external device 303 supports Universal Serial Bus (USB) connectivity and Mobile High-Definition Link (MHL) connectivity. When the external device 303 is connected to the portable terminal 301 via a cable 305, the external device 303 provides its specific function to the portable terminal 301. MHL is a technique of decreasing 13 High Definition Multimedia Interface (HDMI) lines to 3 lines, especially for transmission of multimedia data between the portable terminal 301 and the external device 303.

The external device 303 is also referred to as an accessory and may be any of a TeleVision (TV), a monitor, a beam projector, a touch screen, and the like. For example, if the external device 303 is a TV, then the external device 303 may provide a multimedia play function of receiving multimedia data from the portable terminal 301 and displaying the received multimedia data.

Particularly, when the external device 303 is connected to the portable terminal 301 via the cable 305, the external device 303 determines whether a USB connection message has been received from the portable terminal 301 via a MHL Link Control BUS (CBUS) line of the cable 305. The USB connection message is transmitted to determine whether the external device 303 supports USB connectivity. The CBUS line is a single cable bus that transmits auxiliary data between an MHL source device and an MHL sink device. As shown in FIG. 3, the portable terminal 301 may serve as an MHL source device and the external device 303 may serve as an MHL sink device.

Upon receipt of the USB connection message, the external device 303 determines whether the external device 303 supports USB connectivity. Then the external device 303 generates a USB connection response message based on the determination result and transmits the USB connection response message to the portable terminal 301 via the CBUS line. The USB connection response message is a response to the USB connection message that indicates whether the external device 303 supports USB connectivity. The portable terminal 301 determines whether the external device 303 has been connected to the portable terminal 301 via the cable 305.

Figure 4:
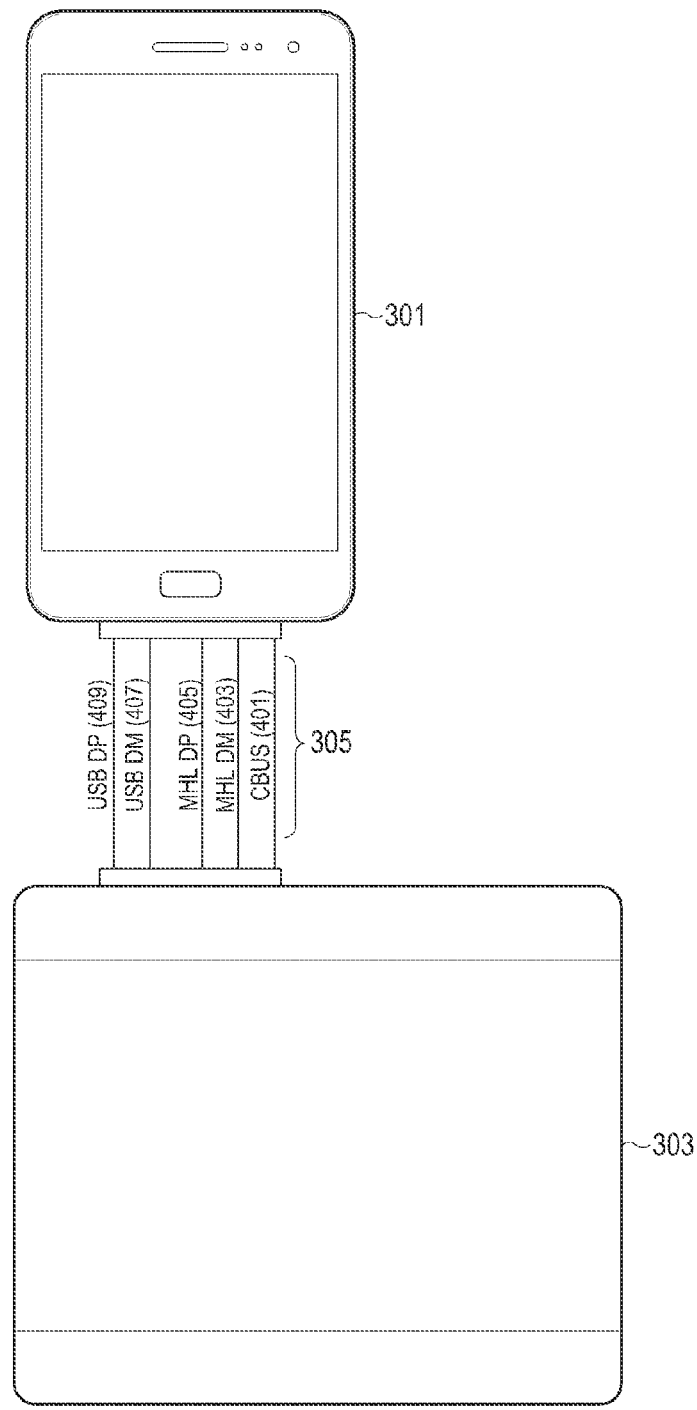
FIG. 4 illustrates lines between a portable terminal and an external device in a communication system according to an embodiment of the present disclosure.

FIG. 4 illustrates lines between a portable terminal and an external device in a communication system according to an embodiment of the present disclosure.

Referring to FIG. 4, the cable 305 between the portable terminal 301 and the external device 303 includes a CBUS line 401, an MHL Data Minus (DM) line 403, an MHL Data Positive (DP) line 405, a USB DM line 407, and a USP DP line 409 to support both USB connectivity and MHL connectivity. Specifically, the CBUS line 401, the MHL DM line 403, and the MHL DP line 405 are lines for MHL connectivity and the USB DM line 407 and the USP DP line 409 are lines for USB connectivity.

If the external device 303 has been connected to the portable terminal 301, then the portable terminal 301 determines whether the external device 303 supports MHL connectivity. If the external device 303 supports MHL connectivity, then the portable terminal 301 is connected to the external device 303 by MHL connectivity. Then the portable terminal 301 generates a USB connection message and transmits the USB connection message to the external device 303 via the CBUS line 401.

The portable terminal 301 receives a USB connection response message as a response to the USB connection message from the external device 303 via the CBUS line 401 and determines, from the USB connection response message, whether the external device 303 supports USB connectivity. If the external device 303 supports USB connectivity, then the portable terminal 301 recognizes the external device 303 by executing a USB host function.

The USB host function may refer to a function that enables operation between portable terminals, such as a PDA, an MP3 player, a portable phone, and other similar and/or suitable portable electronic devices, without intervention of a main computer. For example, the USB host function may include a data exchange function between the portable terminal 301 and the external device 303, and a battery charging function of the portable terminal 301, when the external device 303 is an auxiliary battery.

Figure 5:
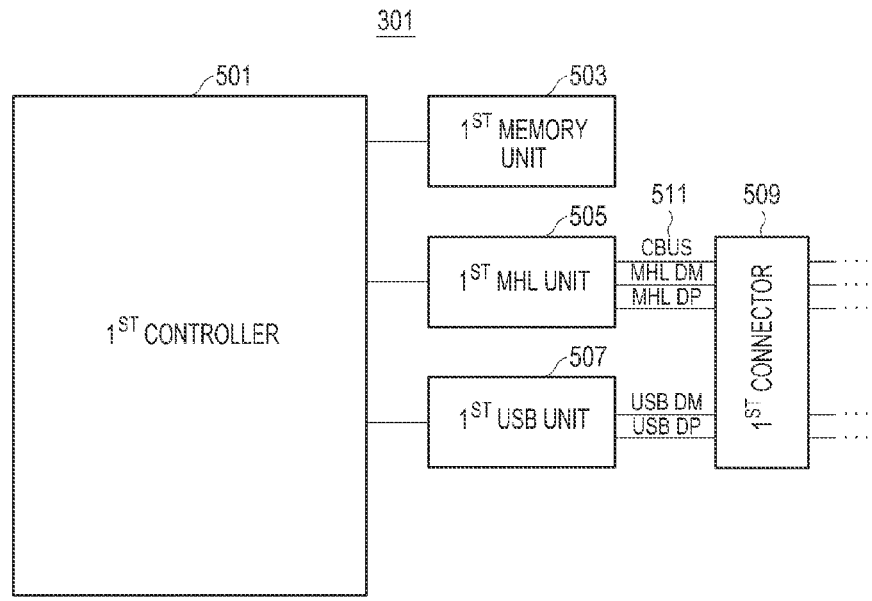
FIG. 5 is a block diagram of a portable terminal according to an embodiment of the present disclosure.

FIG. 5 is a block diagram of a portable terminal according to an embodiment of the present disclosure.

Referring to FIG. 5, the portable terminal 301 includes a first controller 501, a first memory unit 503, a first MHL unit 505, a first USB unit 507, and a first connector 509. The first MHL unit 505 supports HDMI, to which MHL is applied. HDMI is one type of uncompressed digital video/audio interface standards. HDMI interfaces between a multimedia source, such as an HDMI-enabled set-top box, an HDMI-enabled Digital Versatile Disk (DVD) player, and the like, and a device, such as an Audio/Visual (AV) device, a monitor, a digital TV, and the like. MHL is a technique of enabling output of multimedia data from the portable terminal 301 to the external device 303. Multimedia data includes video data, game data, and any other similar and/or suitable type of data, information, and/or content.

The first USB unit 507 supports USB connectivity. USB is a port standard developed for the connection of Personal Computer (PC) peripherals to computers including Intel, Compaq, IBM, DEC, Microsoft, NEC, and Northern Telecom. USB is widely been used and supports a plug-and-play interface that connects a portable terminal directly to a peripheral such as a joystick, a keyboard, a phone, a scanner, a printer, or the like.

The first memory unit 503 includes a program memory (not shown) and a data memory (not shown). The program memory stores a booting program and an Operating System (OS) to control overall operations of the portable terminal 301 and the data memory stores data generated during operations of the portable terminal 301. Especially, the first memory unit 503 stores an MHL driver for MHL connectivity and a USB driver for USB connectivity.

The first connector 509 connects the portable terminal 301 to the external device 303 via the cable 305. For example, if the first connector 509 is an 11-pin connector, the first connector 509 may include a plurality of pins listed in Table 1.

In order to support both USB connectivity and MHL connectivity, the first connector 509 includes a CBUS pin 511, i.e. Pin 8, an MHL DM pin, i.e. Pin 6, an MHL DP pin, i.e. Pin 7, a USB DP pin, i.e. Pin 2, a USB DP pin, i.e. Pin 3, and a USB ID pin, i.e. Pin 10. Specifically, the CBUS pin 511, i.e. Pin 8, the MHL DM pin, i.e. Pin 6, and the MHL DP pin, i.e. Pin 7 are pins for MHL connectivity, whereas the USB DM pin, i.e. Pin 2, the USB DP pin, i.e. Pin 3, and the USB ID pin, i.e. Pin 10, are pins for USB connectivity.

The first controller 501 provides overall control to the portable terminal 301. Particularly, the first controller 501 determines, based on a USB connection response message, whether the external device 303 includes a USB device and recognizes the USB device of the external device by executing a USB host function according to the determination result.

More specifically, the first controller 501 determines whether the portable terminal 301 has been connected to the external device 303 via the cable 305. If the portable terminal 301 has been connected to the external device 303, then the first controller 501 determines whether the external device 303 supports MHL connectivity. The first controller 501 measures a resistance of a USB ID pin, from among a plurality of pins included in the first connector 509, and compares the measured resistance with a predetermined resistance. If the measured resistance is equal to the predetermined resistance, then the first controller 501 determines that the external device 303 supports MHL connectivity.

For example, referring to FIG. 2, if the measured resistance of the USB ID pin is 1 KΩ, then the first controller 501 may determine that the first connector 509 is connected to an MHL cable and that the external device 303 supports MHL connectivity. If determining that the external device 303 supports MHL connectivity, the first controller 501 activates the first MHL unit 505 and connects the portable terminal 301 to the external device 303 via MHL connectivity. Then the first controller 501 generates a USB connection message and transmits the USB connection message to the external device 303 via the CBUS pin 511 of the first connector 509. The USB connection message is generated in a CBUS command format and transmitted to determine whether the external device 303 supports USB connectivity.

The first controller 501 receives a USB connection response message from the external device 303, via the CBUS pin 511 of the first connector 509, as a response to the USB connection message. The USB connection response message is generated in a CBUS command format, indicating whether the external device 303 supports USB connectivity.

The first controller 501 determines, based on the USB connection response message, whether the external device 303 supports USB connectivity. To be more specific, if the first controller 501 determines that the USB connection response message is a first USB connection response message by analyzing the USB connection response message, then the first controller 501 determines that the external device 303 supports USB connectivity. If the USB connection response message is a second USB connection response message, then the first controller 501 determines that the external device 303

TABLE 1

| | Pin | | | | | | | | | | |
|---|---|---|---|---|---|---|---|---|---|---|---|
| | 1 | 2 | 3 | 4 | 5 | 6 | 7 | 8 | 9 | 10 | 11 |
| Function | VBUS | USB DM | USB DP | Power | Power | MHL DM | MHL DP | MHL ID (CBUS) | GND | USB ID | GND | does not support USB connectivity. The first USB connection response message is a message indicating support of USB connectivity in the external device 303 and the second USB connection response message is a message indicating non-support of USB connectivity in the external device 303.

If the external device 303 supports USB connectivity, then the first controller 501 activates the first USB unit 507, activates a USB host driver through the first USB unit 507, and executes a USB host function, thereby recognizing the external device 303. For example, if the external device 303 is a Human Interface Device (HID), such as a USB touch screen, then the first controller 501 may recognize all accessories supported by the USB host driver by activating the USB host driver, and thus may recognize the external device 303 being a touch screen.

Figure 6:
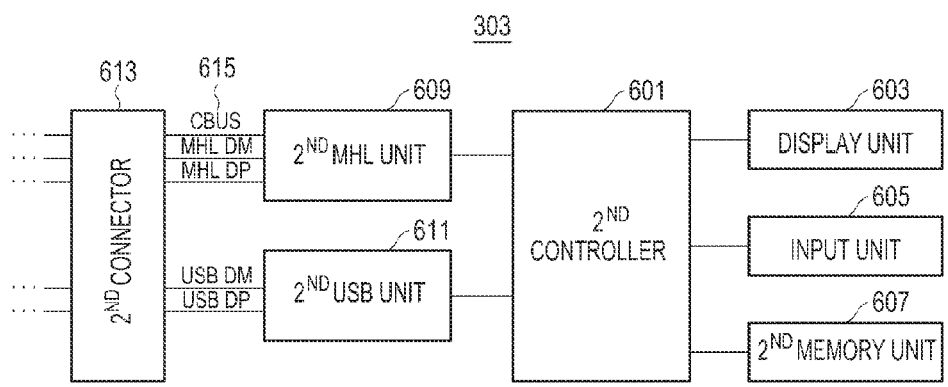
FIG. 6 is a block diagram of an external device according to an embodiment of the present disclosure.

FIG. 6 is a block diagram of an external device according to an embodiment of the present disclosure.

Referring to FIG. 6, the external device 303 is an HDMI-enabled display device that supports both USB connectivity and MHL connectivity. The external device 303 includes a second controller 601, a display unit 603, an input unit 605, a second memory unit 607, a second MHL unit 609, a second USB unit 611, and a second connector 613.

The input unit 605 includes alphanumerical keys used to enter numbers and characters and function keys used to set functions. The display unit 603 displays an image signal on a screen and displays data requested by the second controller 601. The display unit 603 may be configured with a Liquid Crystal Display (LCD). In this case, the display unit 603 may include an LCD controller, a memory that stores image data, and an LCD display device. If the LCD is configured into a touch screen, the display unit 603 may act as the input unit 605 and thus display the same keys as in the input unit 605. However, the present disclosure is not limited thereto, and the display unit 603 may be any type of suitable display device, such as a Light Emitting Diode (LED) display, an Organic LED (OLED) display, a Thin-Film Transistor (TFT) display, or any other similar and/or suitable type of display.

The second memory unit 607 includes a program memory (not shown) and a data memory (not shown). The program memory stores a booting program and an OS to control overall operations of the external device 303 and the data memory stores data generated during operations of the external device 303.

The second MHL unit 609 supports HDMI, to which MHL is applied. The second USB unit 611 supports USB connectivity. The second connector 613 connects the external device 303 to the portable terminal 301 via the cable 305. For example, if the second connector 613 is an 11-pin connector, then the second connector 613 may include the plurality of pins listed in Table 1.

The second controller 601 provides overall control to the external device 303. Particularly, upon receipt of a USB connection message from the portable terminal 301, the second controller 601 generates a USB connection response message and transmits the USB response message to the portable terminal 301.

More specifically, if the external device 303 is connected to the portable terminal 301 via the cable 305, then the second controller 601 activates the second MHL unit 609 and connects the external device 303 to the portable terminal 301 by MHL connectivity. Then the second controller 601 determines whether a USB connection message has been received via a CBUS pin 615 of the second connector 613. The USB connection message is transmitted to determine whether the external device 303 supports USB connectivity.

Upon receipt of the USB connection message, the second controller 601 determines whether the external device 303 supports USB connectivity. The second controller 601 generates a USB connection response message based on the determination result and transmits the USB connection response message to the portable terminal 301 via the CBUS pin 615 of the second connector 613. The USB connection response message is a response to the USB connection message, indicating whether the external device 303 supports USB connectivity.

To be more specific, if the external device 303 supports USB connectivity, then the second controller 601 generates a first USB connection response message indicating support of USB connectivity in the external device 303 and transmits the first USB connection response message to the portable terminal 301. If the external device 303 does not support USB connectivity, then the second controller 601 generates a second USB connection response message indicating non-support of USB connectivity in the external device 303 and transmits the second USB connection response message to the portable terminal 301.

Figure 7:
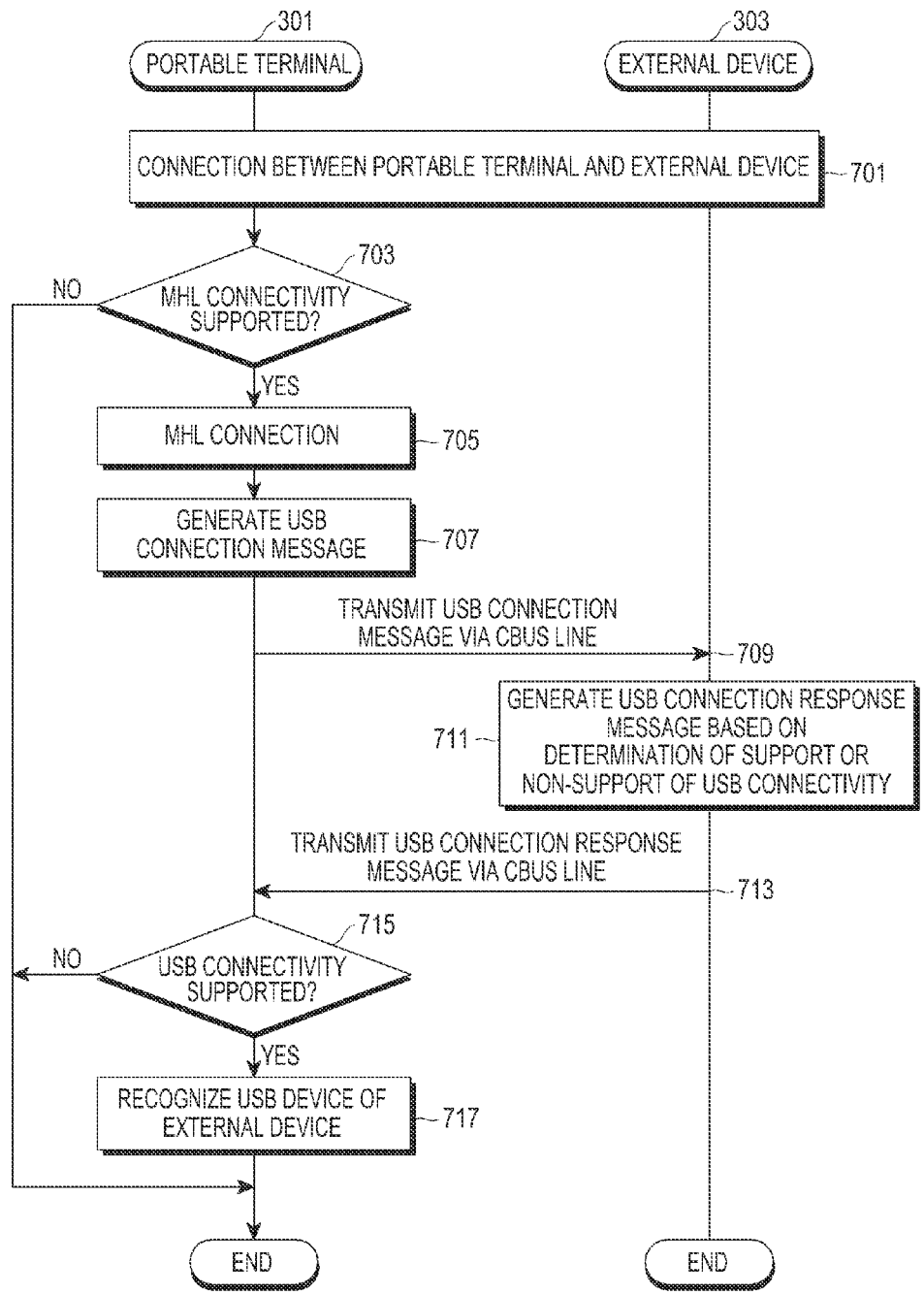
FIG. 7 is a flowchart illustrating an operation of recognizing an external device in a communication system according to an embodiment of the present disclosure.

FIG. 7 is a flowchart illustrating an operation of recognizing an external device in a communication system according to an embodiment of the present disclosure.

Referring to FIG. 7, the portable terminal 301 is connected to the external device 303 via the cable 305 such that there is a connection between the portable terminal 301 and the external device 303 in operation 701. The portable terminal 301 determines whether the external device 303 supports MHL connectivity in operation 703. If the external device 303 supports MHL connectivity, then the portable terminal 301 goes to operation 705 and otherwise, the portable terminal 301 terminates the operation of recognizing the external device 303.

The portable terminal 301 connects to the external device 303 by MHL connectivity such that there is an MHL connection in operation 705 and generates a USB connection message in operation 707. The USB connection message is generated to determine whether the external device 303 supports USB connectivity.

In operation 709, the portable terminal 301 transmits the USB connection message, to the external device 303, via the CBUS line 401. The CBUS line 401 is a single cable bus through which auxiliary data is transmitted from an MHL source device and an MHL sink device. As shown in FIG. 7, the portable terminal 301 may serve as an MHL source device, whereas the external device 303 may serve as an MHL sink device.

In operation 711, the external device 303 receives the USB connection message, determines whether the external device 303 supports USB connectivity, and generates a USB connection response message based on the determination result. The USB connection response message is a response to the USB connection message and indicates whether the external device 303 supports USB connectivity. The external device 303 transmits the USB connection response message to the portable terminal 301 via the CBUS line 401 in operation 713.

In operation 715, the portable terminal 301 receives the USB connection response message as a response to the USB connection message and determines, based on the USB connection response message, whether the external device 303 supports USB connectivity. If the external device 303 supports USB connectivity, then the portable terminal 301 goes to operation 717 and otherwise, the portable terminal 301 terminates the operation of recognizing the external device 303.

The portable terminal 301 recognizes a USB device of the external device 303 by executing a USB host function in operation 717. The USB host function refers to a function that enables operation between portable terminals, such as a PDA, an MP3 player, and a portable phone, without intervention of a main computer. For example, the USB host function may include a data exchange function between the portable terminal 301 and the external device 303, and a battery charging function of the portable terminal 301, when the external device 303 is an auxiliary battery.

Figure 8:
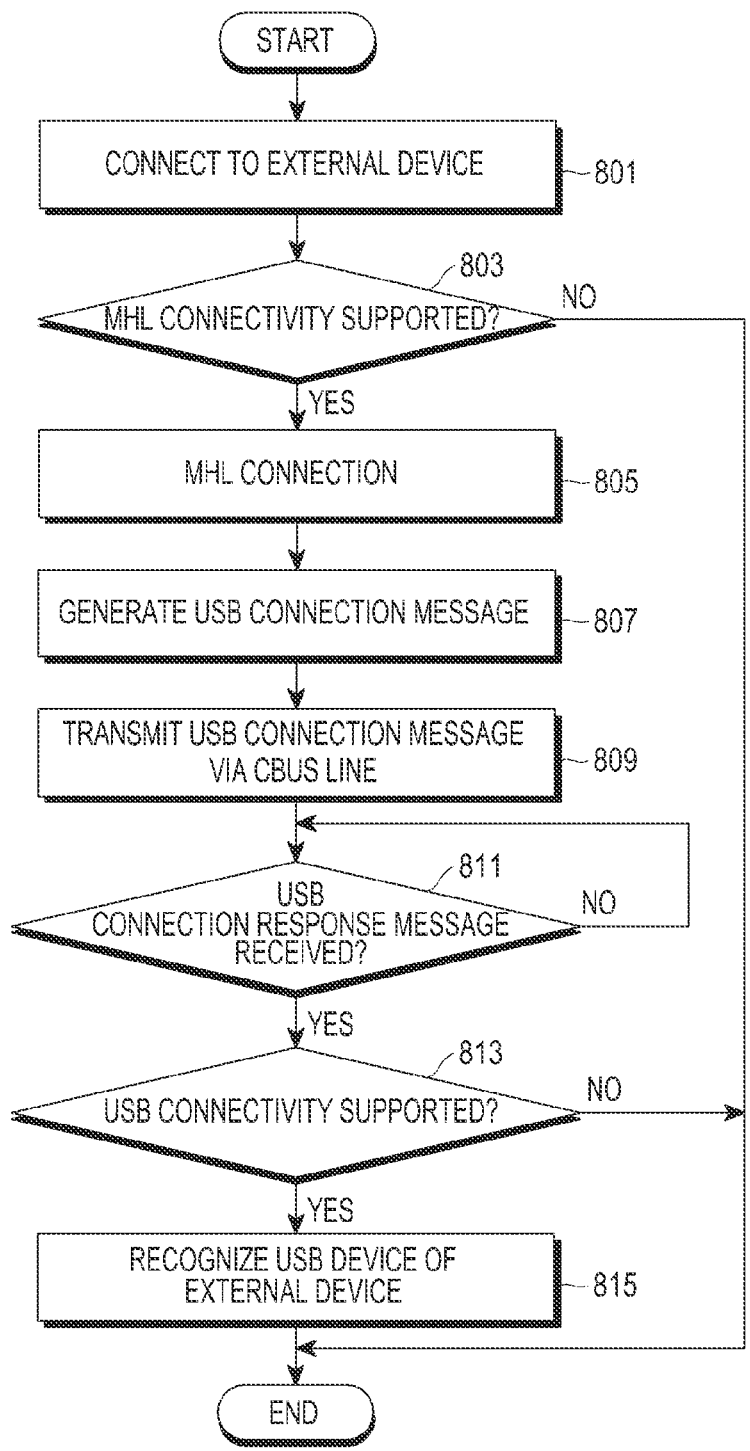
FIG. 8 is a flowchart illustrating an operation of recognizing an external device in a portable terminal according to an embodiment of the present disclosure.

FIG. 8 is a flowchart illustrating an operation of recognizing an external device in a portable terminal according to an embodiment of the present disclosure.

Referring to FIG. 8, the first controller 501 of the portable terminal 301 connects the portable terminal 301 to the external device 303 via the first connector 509 in operation 801 and determines whether the external device 303 supports MHL connectivity in operation 803.

In order to determine whether the external device 303 supports MHL connectivity, the first controller 501 measures the resistance of a USB ID pin, from among a plurality of pins included in the first connector 509, and compares the measured resistance with a predetermined resistance. If the measured resistance is equal to the predetermined resistance, then the first controller 501 determines that the external device 303 supports MHL connectivity. For example, referring to FIG. 2, if the measured resistance of the USB ID pin is 1 KΩ, then the first controller 501 may determine that the first connector 509 is connected to an MHL cable and that the external device 303 supports MHL connectivity.

If the first controller 501 determines that the external device 303 supports MHL connectivity, then the first controller 501 goes to operation 805 and otherwise, the first controller 501 terminates the operation of recognizing the external device 303.

In operation 805, the first controller 501 activates the first MHL unit 505 and connects the portable terminal 301 to the external device 303 by establishing an MHL connection. Then the first controller 501 generates a USB connection message in operation 807 and transmits the USB connection message to the external device 303 via the CBUS line of the first connector 509 in operation 809. The USB connection message is generated in a CBUS command format and transmitted to determine whether the external device 303 supports USB connectivity.

In operation 811, the first controller 501 determines whether a USB connection response message from the external device 303 is received via the CBUS line of the first connector 509, as a response to the USB connection message. The USB connection response message is generated in a CBUS command format, indicating whether the external device 303 supports USB connectivity.

If the USB connection response message is received, then the first controller 501 goes to operation 813 and otherwise, the first controller 501 repeats operation 811.

In operation 813, the first controller 501 determines, based on the USB connection response message, whether the external device 303 supports USB connectivity. If the external device 303 supports USB connectivity, then the first controller 501 goes to operation 815 and otherwise, the first controller 501 terminates the operation of recognizing the external device 303.

To be more specific, if the first controller 501 determines that the USB connection response message is a first USB connection response message by analyzing the USB connection response message, then the first controller 501 determines that the external device 303 supports USB connectivity. If the USB connection response message is a second USB connection response message, then the first controller 501 determines that the external device 303 does not support USB connectivity. The first USB connection response message is a message indicating support of USB connectivity in the external device 303 and the second USB connection response message is a message indicating non-support of USB connectivity in the external device 303.

In operation 815, the first controller 501 activates the first USB unit 507, activates a USB host driver through the first USB unit 507, and executes a USB host function, thereby recognizing a USB device of the external device 303. For example, if the external device 303 is an HID, such as a USB touch screen, then the first controller 501 may recognize all accessories supported by the USB host driver by activating the USB host driver and thus may recognize the external device 303 being a touch screen.

Figure 9:
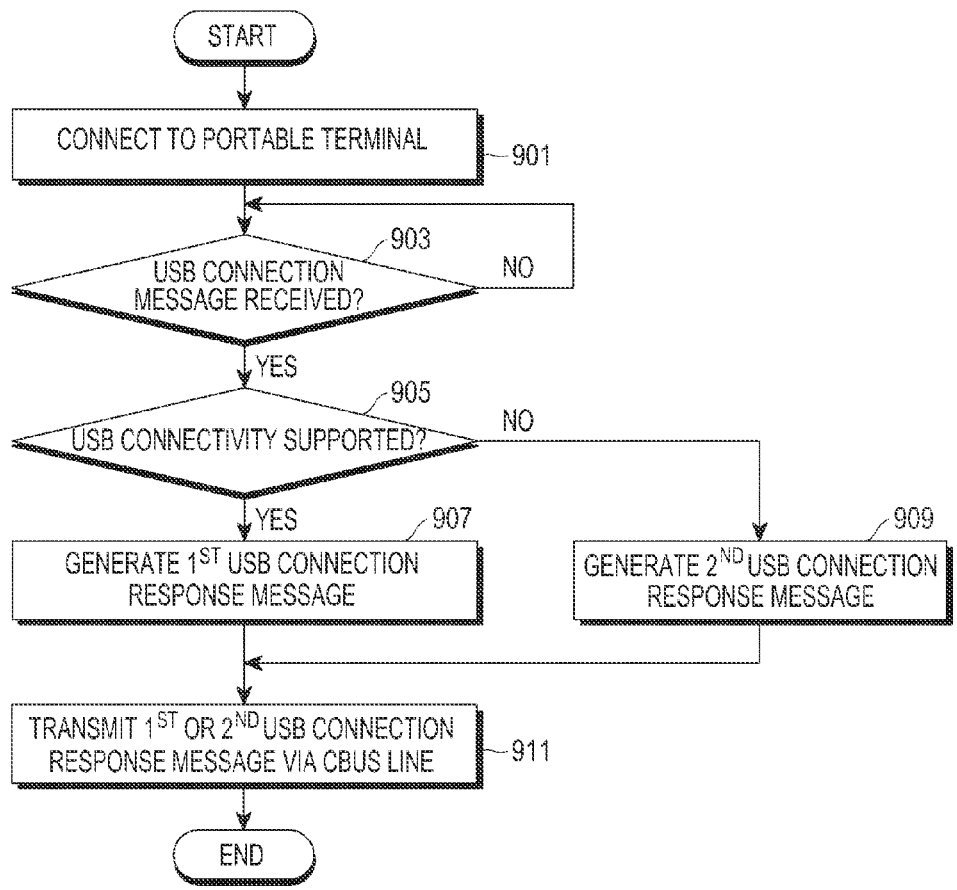
FIG. 9 is a flowchart illustrating an operation of transmitting a USB connection response message in an external device according to an embodiment of the present disclosure.

FIG. 9 is a flowchart illustrating an operation of transmitting a USB connection response message in an external device according to an embodiment of the present disclosure.

Referring to FIG. 9, the second controller 601 of the external device 303 connects the external device 303 to the portable terminal 301 via the cable 305 in operation 901. In operation 903, the second controller 601 activates the second MHL unit 609, connects the external device 303 to the portable terminal 301 by MHL connectivity, and determines whether a USB connection message has been received via the CBUS line of the second connector 613 in operation 903. The USB connection message is transmitted to determine whether the external device 303 supports USB connectivity. Upon receipt of the USB connection message, the second controller 601 goes to operation 905 and otherwise, the second controller 601 repeats operation 903.

In operation 905, the second controller 601 determines whether the external device 303 supports USB connectivity. If the external device 303 supports USB connectivity, then the second controller 601 goes to operation 907 and otherwise, the second controller 601 goes to operation 909.

In operation 907, the second controller 601 generates a first USB connection response message indicating support of USB connectivity in the external device 303 and goes to operation 911. On the other hand, the second controller 601 generates a second USB connection response message indicating non-support of USB connectivity in the external device 303 in operation 909 and goes to operation 911. The second controller 601 transmits the first USB connection response message or the second USB connection response message, via the CBUS line, to the portable terminal 301 in operation 911.

Figure 10:
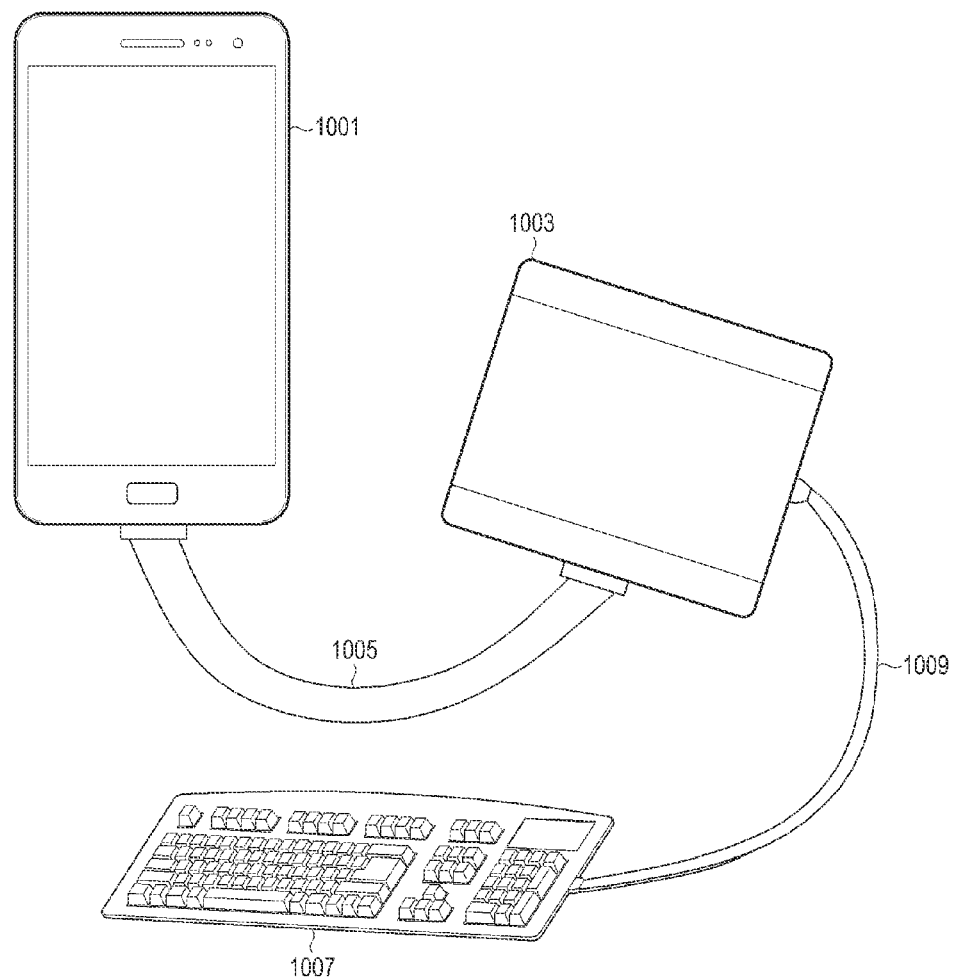
FIG. 10 illustrates a configuration of a communication system according to another embodiment of the present disclosure.

FIG. 10 illustrates a configuration of a communication system according to another embodiment of the present disclosure.

Referring to FIG. 10, the communication system includes a portable terminal 1001, a first external device 1003, and a second external device 1007. The second external device 1007 supports USB connectivity, is connected to the first external device 1003 via a USB cable 1009, and provides a specific function to at least one of the first external device 1003 and the portable terminal 1001. For example, if the second external device 1007 is a keyboard, the second external device 1007 is used as an input device. Thus, the second external device 1007 transmits data related to a user-selected key to at least one of the first external device 1003 and the portable terminal 1001 through the first external device 1003.

The first external device 1003 supports USB connectivity and MHL connectivity. When the first external device 1003 is connected to the portable terminal 1001 via a cable 1005, the first external device 1003 provides its specific function to the portable terminal 1001. MHL is a technique of decreasing 13 HDMI lines to 3 lines, especially for transmission of multimedia data between the portable terminal 1001 and the external device 1003.

The first and second external devices 1003 and 1007 are called accessories. The first external device 1003 may be a display device supporting MHL connectivity, such as a TV, a monitor, a beam projector, a touch screen, or the like. The second external device 1007 may be a device supporting USB connectivity, such as a USB memory, an auxiliary USB battery, a dongle, a USB mouse, or the like.

Particularly, when the first external device 1003 is connected to the portable terminal 1001 via the cable 1005, the first external device 1003 determines whether a USB connection message has been received from the portable terminal 1001 via a CBUS line of the cable 1005. The USB connection message is transmitted to determine whether the first external device 1003 supports USB connectivity. The CBUS is a single cable bus that transmits auxiliary data between an MHL source device and an MHL sink device. As shown in FIG. 10, the portable terminal 1001 may serve as an MHL source device and the first external device 1003 may serve as an MHL sink device.

Upon receipt of the USB connection message, the first external device 1003 determines whether the first external device 1003 supports USB connectivity. Then the first external device 1003 generates a USB connection response message based on the determination result and transmits the USB connection response message to the portable terminal 1001 via a CBUS line. The USB connection response message is a response to the USB connection message and indicates whether the first external device 1003 supports USB connectivity. The portable terminal 1001 determines whether the first external device 1003 has been connected to the portable terminal 301 via the cable 1005.

Figure 11:
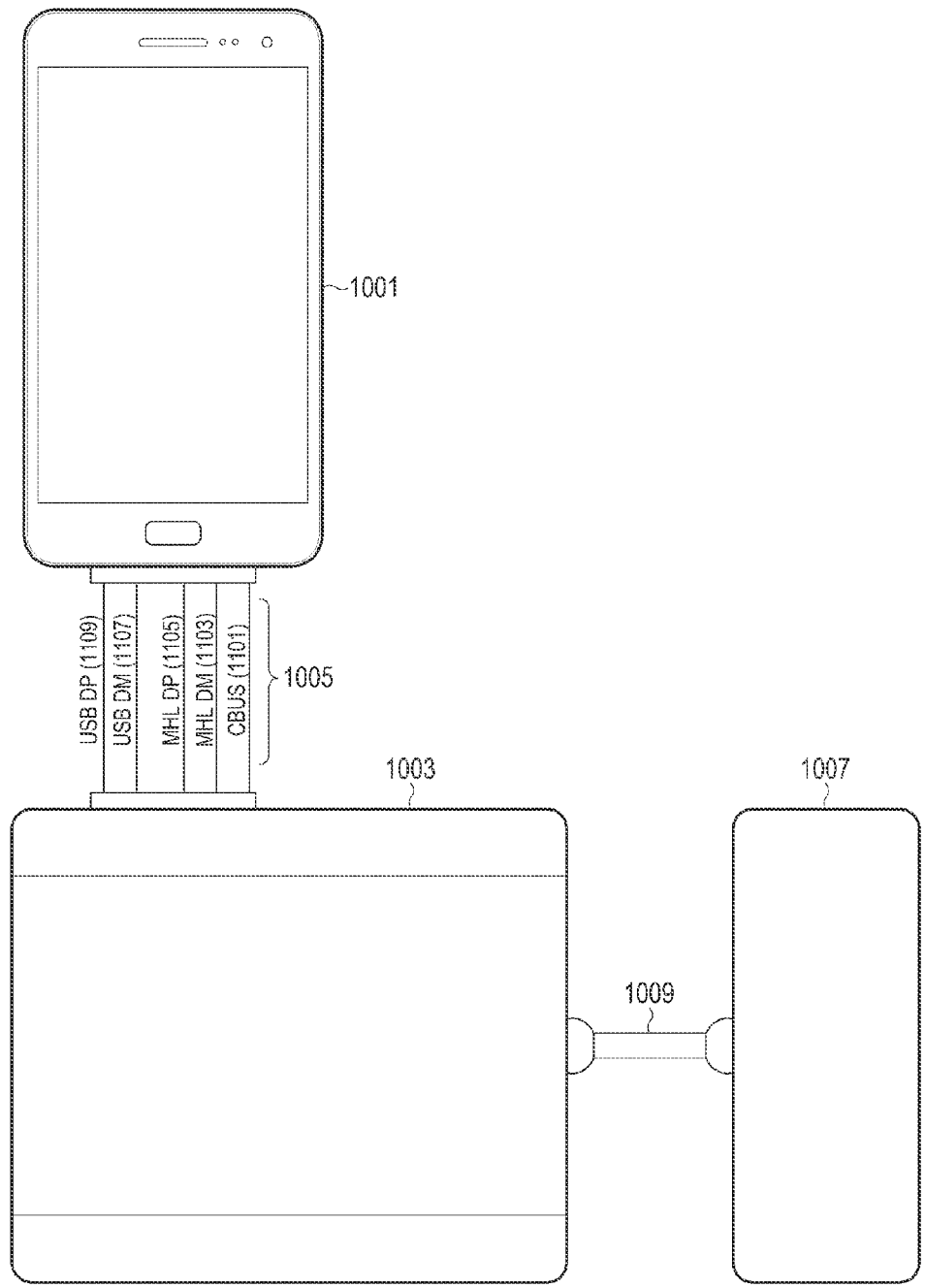
FIG. 11 illustrates lines between a portable terminal and an external device in a communication system according to another embodiment of the present disclosure.

FIG. 11 illustrates lines between a portable terminal and an external device in a communication system according to another embodiment of the present disclosure.

Referring to FIG. 11, the cable 1005 between the portable terminal 1001 and the first external device 1003 includes a CBUS line 1101, an MHL DM line 1103, an MHL DP line 1105, a USB DM line 1107, and a USP DP line 1109 to support both USB connectivity and MHL connectivity. Specifically, the CBUS line 1101, the MHL DM line 1103, and the MHL DP line 1105 are lines for MHL connectivity and the USB DM line 1107 and the USP DP line 1109 are lines for USB connectivity.

If the first external device 1003 has been connected to the portable terminal 1001, then the portable terminal 1001 determines whether the first external device 1003 supports MHL connectivity. If the first external device 1003 supports MHL connectivity, then the portable terminal 1001 is connected to the first external device 1003 by MHL connectivity. Then the portable terminal 1001 generates a USB connection message and transmits the USB connection message to the first external device 1003 via the CBUS line 1101.

The portable terminal 1001 receives a USB connection response message, as a response to the USB connection message, from the first external device 1003 via the CBUS line 1101 and determines, from the USB connection response message, whether the first external device 1003 supports USB connectivity. If the first external device 1003 supports USB connectivity, then the portable terminal 1101 recognizes USB devices of the first external device 1003 and the second external device 1007, which is connected to the first external device 1003, by executing a USB host function. For example, if the first external device 1003 includes USB devices, such as a USB hub and a USB touch screen, then the portable terminal 1001 may recognize the USB hub and the USB touch screen of the first external device 1003 via the USB host function.

The USB host function refers to a function that enables operation between portable terminals, such as a PDA, an MP3 player, and a portable phone, without intervention of a main computer. For example, the USB host function may include a data exchange function between the portable terminal 1001 and the first external device 1003, and a battery charging function of the portable terminal 1001, when the first external device 1003 is an auxiliary battery.

The portable terminal 1001 uses a specific function provided by the second external device 1007 connected directly to the first external device 1003 by a USB enumeration procedure. The USB enumeration procedure is known in the art and will not be described herein in detail.

Figure 12:
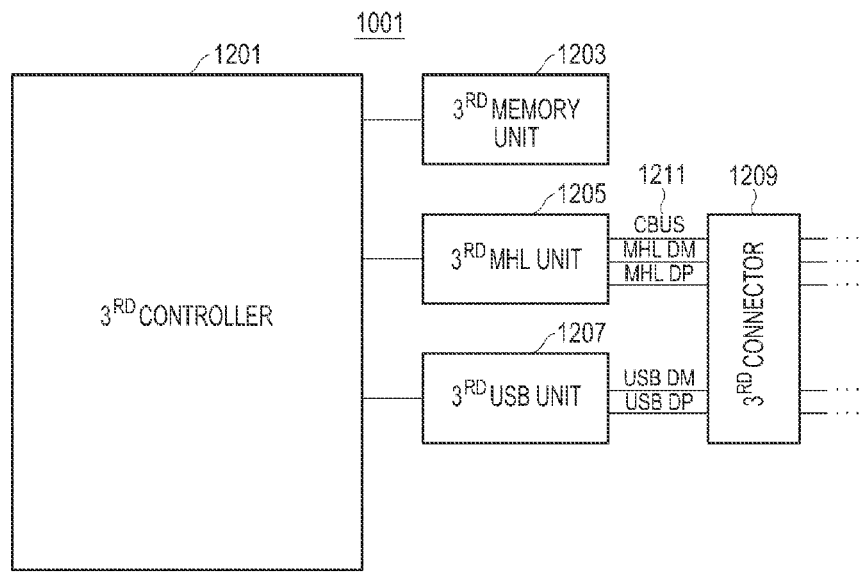
FIG. 12 is a block diagram of a portable terminal according to another embodiment of the present disclosure.

FIG. 12 is a block diagram of a portable terminal according to another embodiment of the present disclosure.

Referring to FIG. 12, the portable terminal 1001 includes a third controller 1201, a third memory unit 1203, a third MHL unit 1205, a third USB unit 1207, and a third connector 1209 that includes a CBUS pin 1211. The third MHL unit 1205 supports HDMI, to which MHL is applied. HDMI interfaces between a multimedia source, such as an HDMI-enabled set-top box, an HDMI-enabled Digital Versatile Disc (DVD) player, and the like, and a device such as an Audio Video (AV) device, a monitor, a digital TV, and the like. MHL is a technique of enabling output of multimedia data from the portable terminal 1001 to an external device. Multimedia data includes video data, game data, media content data, sound data, image data, and the like. The third USB unit 1207 supports USB connectivity.

The third memory unit 1203 includes a program memory and a data memory. The program memory stores a booting program and an Operating System (OS) to control overall operations of the portable terminal 1001 and the data memory stores data generated during operations of the portable terminal 1001. Especially, the third memory unit 1003 stores an MHL driver for MHL connectivity and a USB driver for USB connectivity.

The third connector 1009 connects the portable terminal 1001 to the first external device 1003 via the cable 1005. For example, if the third connector 1209 is an 11-pin connector, the third connector 1209 may include the plurality of pins listed in Table 1.

The third controller 1201 provides overall control to the portable terminal 1001. Particularly, the third controller 1201 determines, based on a USB connection response message, whether an external device includes a USB device and recognizes the USB device of the external device by executing a USB host function according to the determination result.

More specifically, the third controller 1201 determines whether the portable terminal 1001 has been connected to the first external device 1003 via the cable 1005. If the portable terminal 1001 has been connected to the first external device 1003, then the third controller 1201 determines whether the first external device 1003 supports MHL connectivity. The third controller 1201 measures the resistance of a USB ID pin, from among a plurality of pins included in the third connector 1209, and compares the measured resistance with a predetermined resistance. If the measured resistance is equal to the predetermined resistance, then the third controller 1201 determines that the first external device 1003 supports MHL connectivity.

For example, referring to FIG. 2, if the measured resistance of the USB ID pin is 1 KΩ, then the third controller 1201 may determine that the third connector 1209 is connected to an MHL cable and that the first external device 1003 supports MHL connectivity.

If the third controller 1201 determines that the first external device 1003 supports MHL connectivity, then the third controller 1201 activates the third MHL unit 1205 and connects the portable terminal 1001 to the first external device 1003 by MHL connectivity. Then the third controller 1201 generates a USB connection message and transmits the USB connection message via the CBUS pin of the third connector 1209. The USB connection message is generated in a CBUS command format and transmitted to determine whether the first external device 1003 supports USB connectivity.

The third controller 1201 receives a USB connection response message from the first external device 1003 via the CBUS pin of the third connector 1209, as a response to the USB connection message. The USB connection response message is generated in a CBUS command format and indicates whether the first external device 1003 supports USB connectivity.

The third controller 1201 determines, based on the USB connection response message, whether the first external device 1003 supports USB connectivity. To be more specific, if the third controller 1201 determines that the USB connection response message is a first USB connection response message by analyzing the USB connection response message, then the third controller 1201 determines that the first external device 1003 supports USB connectivity. If the USB connection response message is a second USB connection response message, then the third controller 1201 determines that the first external device 1003 does not support USB connectivity. The first USB connection response message is a message indicating support of USB connectivity in the first external device 1003 and the second USB connection response message is a message indicating non-support of USB connectivity in the first external device 1003.

If the first external device 1003 supports USB connectivity, then the third controller 1201 activates the third USB unit 1207, activates a USB host driver through the third USB unit 1207, and executes a USB host function, thereby recognizing USB devices of the first external device 1003.

For example, if the first external device 1003 includes USB devices such as a USB hub and a USB touch screen, then the portable terminal 1001 may recognize all accessories supported by a USB host driver by activating the USB host driver and thus may recognize the USB hub and the USB touch screen of the first external device 1003. As the third controller 1201 recognizes the USB hub of the first external device 1003, the third controller 1201 may recognize a USB device of the second external device 1007.

The portable terminal 1001 uses a specific function provided by the second external device 1007 connected directly to the first external device 1003 by a USB enumeration procedure.

Figure 13:
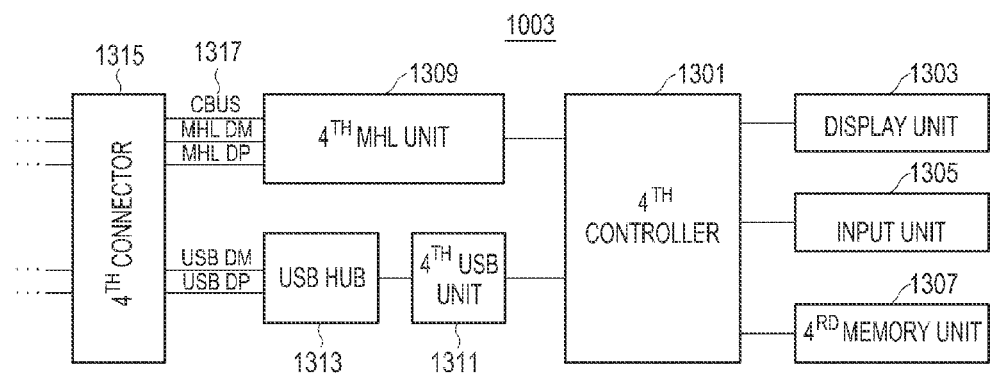
FIG. 13 is a block diagram of an external device according to another embodiment of the present disclosure.

FIG. 13 is a block diagram of an external device according to another embodiment of the present disclosure.

Referring to FIG. 13, the first external device 1003 is an HDMI-enabled display device that supports both USB connectivity and MHL connectivity. The first external device 1003 includes a fourth controller 1301, a display unit 1303, an input unit 1305, a fourth memory unit 1307, a fourth MHL unit 1309, a fourth USB unit 1311, a USB hub 1313, and a fourth connector 1315 that includes a CBUS pin 1317.

The input unit 1305 includes alphanumerical keys used to enter numbers and characters and function keys used to set functions. The display unit 1303 displays an image signal on a screen and displays data requested by the fourth controller 1301. The display unit 1303 may be configured with an LCD or any other similar and/or suitable display device type. In this case, the display unit 1303 may include an LCD controller, a memory that stores image data, and an LCD display device. If the LCD is configured to be a touch screen, then the display unit 1303 may act as the input unit 1305 and thus display the same keys, similar keys, and/or other keys, as in the input unit 1305.

The fourth MHL unit 1309 supports HDMI to which MHL is applied. The fourth USB unit 1311 supports USB connectivity. The fourth memory unit 1307 includes a program memory and a data memory. The program memory stores a booting program and an OS to control overall operations of the first external device 1003 and the data memory stores data generated during operations of the first external device 1003.

The fourth connector 1315 connects the first external device 1003 to the portable terminal 1001 via the cable 1005. For example, if the fourth connector 1315 is an 11-pin connector, then the fourth connector 1315 may include the plurality of pins listed in Table 1. The USB hub 1313 includes at least one USB port and connects the first external device 1003 to the second external device 1007 via the USB cable 1009 connected to a USB port.

The fourth controller 1301 provides overall control to the first external device 1003. Particularly, upon receipt of a USB connection message from the portable terminal 1001, the fourth controller 1301 generates a USB connection response message and transmits the USB response message to the portable terminal 1001.

More specifically, if the first external device 1003 is connected to the portable terminal 1001 via the cable 1005, then the fourth controller 1301 activates the fourth MHL unit 1309 and connects the first external device 1003 to the portable terminal 1001 by MHL connectivity. Then the fourth controller 1301 determines whether a USB connection message has been received via the CBUS pin 1317 of the fourth connector 1315. The USB connection message is transmitted to determine whether the first external device 1003 supports USB connectivity.

Upon receipt of the USB connection message, the fourth controller 1301 determines whether the first external device 1003 supports USB connectivity. The fourth controller 1301 generates a USB connection response message based on the determination result and transmits the USB connection response message to the portable terminal 1001 via the CBUS pin 1317 of the fourth connector 1315. The USB connection response message is a response to the USB connection message and indicates whether the first external device 1003 supports USB connectivity.

To be more specific, if the first external device 1003 supports USB connectivity, then the fourth controller 1301 generates a first USB connection response message indicating support of USB connectivity in the first external device 1003 and transmits the first USB connection response message to the portable terminal 1001. If the first external device 1003 does not support USB connectivity, then the fourth controller 1301 generates a second USB connection response message indicating non-support of USB connectivity in the first external device 1003 and transmits the second USB connection response message to the portable terminal 1001.

Figure 14:
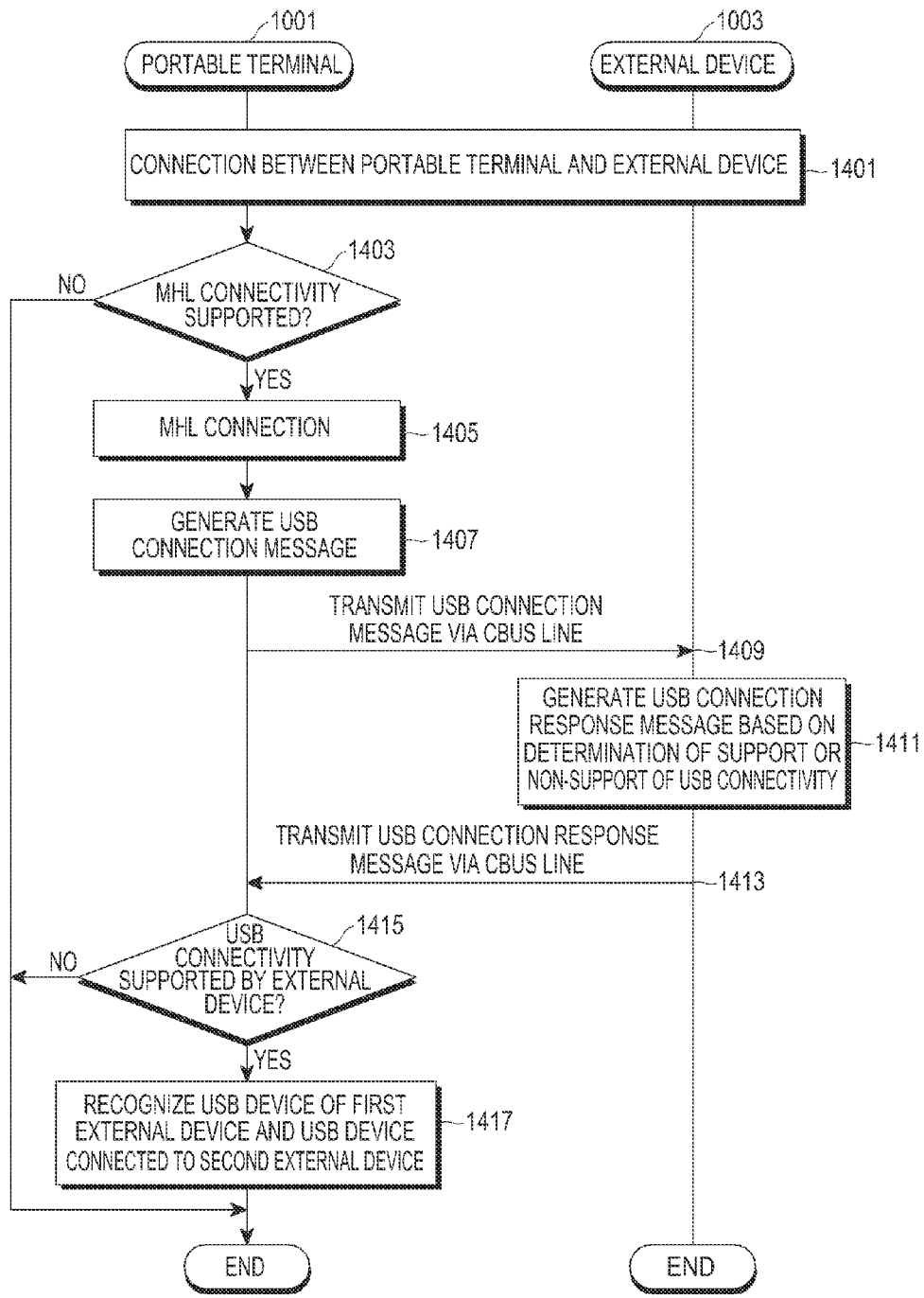
FIG. 14 is a flowchart illustrating an operation of recognizing an external device in a communication system according to another embodiment of the present disclosure.

FIG. 14 is a flowchart illustrating an operation of recognizing an external device in a communication system according to another embodiment of the present disclosure.

Referring to FIG. 14, the portable terminal 1001 is connected to the first external device 1003 via the cable 1005 in operation 1401. The portable terminal 1001 determines whether the first external device 1003 supports MHL connectivity in operation 1403. If the first external device 1003 supports MHL connectivity, then the portable terminal 1001 goes to operation 1405 and otherwise, the portable terminal 1001 terminates the operation of recognizing the first external device 1003.

The portable terminal 1001 connects to the first external device 1003 by MHL connectivity such that there is an MHL connection in operation 1405 and generates a USB connection message in operation 1407. The USB connection message is generated to determine whether the first external device 1003 supports USB connectivity.

In operation 1409, the portable terminal 1001 transmits the USB connection message to the first external device 1003 via the CBUS line 1101. The CBUS is a single cable bus through which auxiliary data is transmitted from an MHL source device and an MHL sink device. As shown in FIG. 14, the portable terminal 1001 may serve as an MHL source device, whereas the first external device 1003 may serve as an MHL sink device.

In operation 1411, the first external device 1003 receives the USB connection message, determines whether the first external device 1003 supports USB connectivity, and generates a USB connection response message based on the determination result. The USB connection response message is a response to the USB connection message and indicates whether the first external device 1003 supports USB connectivity. The first external device 1003 transmits the USB connection response message to the portable terminal 1001 via the CBUS line in operation 1413.

In operation 1415, the portable terminal 1001 receives the USB connection response message as a response to the USB connection message and determines, based on the USB connection response message, whether the first external device 1003 supports USB connectivity. If the first external device 1003 supports USB connectivity, then the portable terminal 1001 goes to operation 1417 and otherwise, the portable terminal 1001 terminates the operation of recognizing the first external device 1003. The portable terminal 1001 recognizes at least one USB device of the first external device 1003 and a USB device of the second external device 1007 by executing a USB host function in operation 1417. The USB host function refers to a function that enables operation between portable terminals, such as a PDA, an MP3 player, and a portable phone, without intervention of a main computer.

For example, if the first external device 1003 includes USB devices, such as a USB hub and a USB touch screen, then the portable terminal 1001 may recognize all accessories supported by a USB host driver by activating the USB host driver, and thus may recognize the USB hub and the USB touch screen of the first external device 1003. As the third controller 1201 recognizes the USB hub of the first external device 1003, the third controller 1201 may recognize a USB device of the second external device 1007.

The portable terminal 1001 uses a specific function provided by the second external device 1007 connected directly to the first external device 1003 by a USB enumeration procedure.

Figure 15:
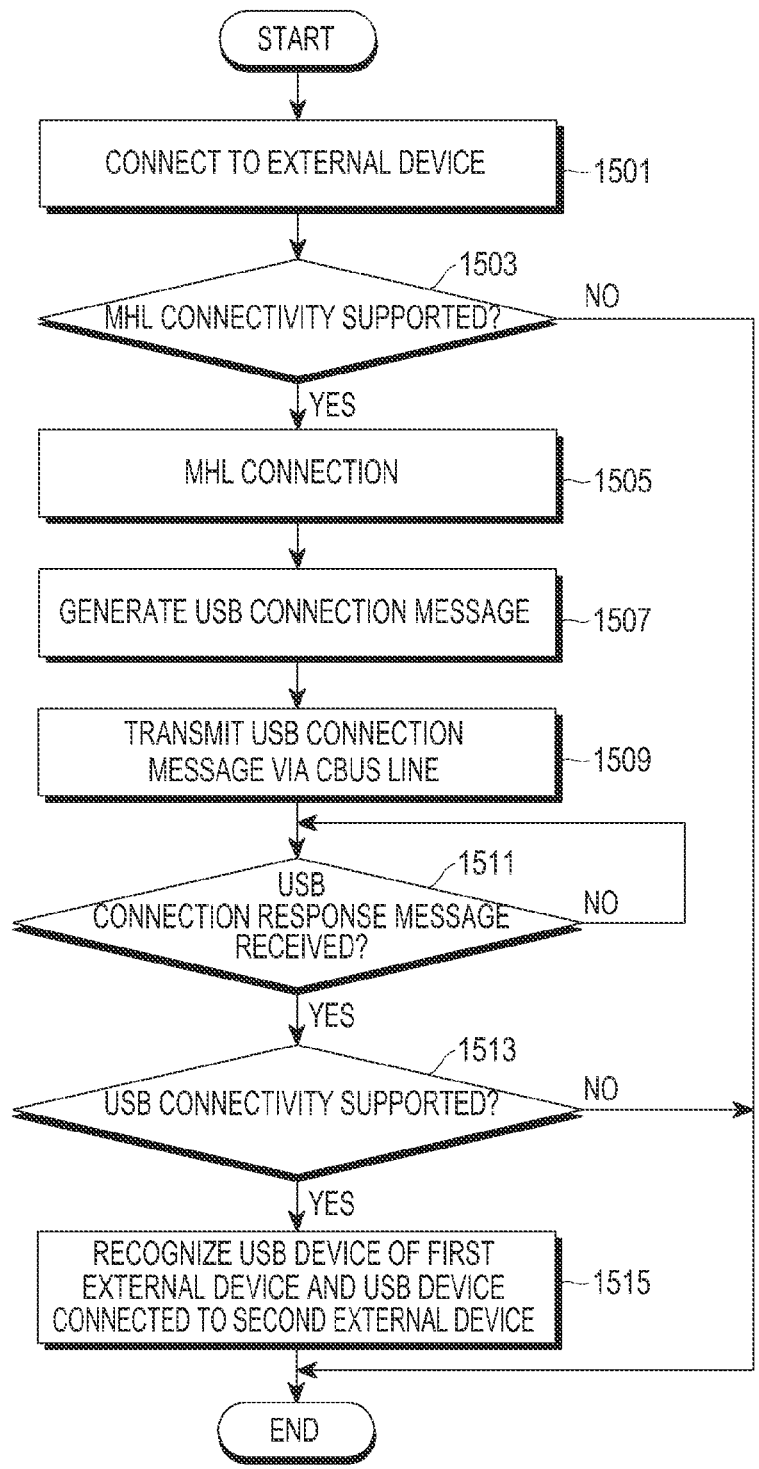
FIG. 15 is a flowchart illustrating an operation of recognizing an external device in a portable terminal according to another embodiment of the present disclosure.

FIG. 15 is a flowchart illustrating an operation of recognizing an external device in a portable terminal according to another embodiment of the present disclosure.

Referring to FIG. 15, the third controller 1201 of the portable terminal 1001 connects the portable terminal 1001 to the first external device 1003 via the third connector 1209 in operation 1501 and determines whether the first external device 1003 supports MHL connectivity in operation 1503.

The third controller 1201 measures the resistance of a USB ID pin, from among a plurality of pins included in the third connector 1209, and compares the measured resistance with a predetermined resistance. If the measured resistance is equal to the predetermined resistance, then the third controller 1201 determines that the first external device 1003 supports MHL connectivity. For example, referring to FIG. 2, if the measured resistance of the USB ID pin is 1 KΩ, then the third controller 1201 may determine that the third connector 1209 is connected to an MHL cable and that the first external device 1003 supports MHL connectivity.

If the first external device 1003 supports MHL connectivity, then the third controller 1201 goes to operation 1505 and otherwise, the third controller 1201 terminates the operation of recognizing the first external device 1003.

In operation 1505, the third controller 1201 activates the third MHL unit 1205 and connects the portable terminal 1001 to the first external device 1003 by establishing an MHL connection. Then the third controller 1201 generates a USB connection message in operation 1507 and transmits the USB connection message to the first external device 1003 via the CBUS line of the third connector 1209 in operation 1509. The USB connection message is generated in a CBUS command format and transmitted to determine whether the first external device 1003 supports USB connectivity.

In operation 1511, the third controller 1201 determines whether a USB connection response message is received from the first external device 1003 via the CBUS line of the third connector 1209, as a response to the USB connection message. The USB connection response message is generated in a CBUS command format and indicates whether the first external device 1003 supports USB connectivity.

If it is determined, in operation 1511, that the USB connection response message has been received, then the third controller 1201 goes to operation 1513 and otherwise, the third controller 1201 repeats operation 1511.

In operation 1513, the third controller 1201 determines, based on the USB connection response message, whether the first external device 1003 supports USB connectivity. If the first external device 1003 supports USB connectivity, then the third controller 1201 goes to operation 1515 and otherwise, the third controller 1201 terminates the operation of recognizing the first external device 1003.

To be more specific, if the third controller 1201 determines that the USB connection response message is a first USB connection response message by analyzing the USB connection response message, then the third controller 1201 determines that the first external device 1003 supports USB connectivity. If the USB connection response message is determined to be a second USB connection response message, then the third controller 1201 determines that the first external device 1003 does not support USB connectivity. The first USB connection response message is a message indicating support of USB connectivity in the first external device 1003 and the second USB connection response message is a message indicating non-support of USB connectivity in the first external device 1003.

In operation 1515, the third controller 1201 activates the third USB unit 1207, activates a USB host driver through the third USB unit 1207, and executes a USB host function, thereby recognizing at least one USB device of the first external device 1003 and the second external device 1007 connected directly to the first external device 1003.

For example, if the first external device 1003 includes USB devices, such as a USB hub and a USB touch screen, then the third controller 1021 may recognize all accessories supported by a USB host driver by activating the USB host driver, and thus may recognize the USB hub and the USB touch screen of the first external device 1003. As the third controller 1201 recognizes the USB hub of the first external device 1003, the third controller 1201 may recognize a USB device of the second external device 1007.

The third controller 1201 uses a specific function provided by the second external device 1007 connected directly to the first external device 1003 by a USB enumeration procedure. An operation of transmitting a USB connection response message in an external device according to another embodiment of the present disclosure is same as the operation illustrated in FIG. 9 and thus an operation of transmitting a USB connection response message in the first external device 1003 will not be described herein.

As is apparent from the above description of the present disclosure, all external devices supporting USB connectivity may be recognized in a communication system. All external devices supporting USB connectivity may be recognized by MSB connectivity in a communication system. All external devices supporting USB connectivity may be recognized using a CBUS line among MHL lines in a communication system.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors, such as an Integrated Circuit (IC), an Application Specific IC (ASIC), an Erasable Programmable Read Only Memory (EPROM), or any other similar and/or suitable hardware device that performs information processing, operating in accordance with stored instructions may implement the functions associated with the various embodiments of the present disclosure as described above. If such is the case, it is within the scope of the present disclosure that such instructions may be stored on one or more processor and/or computer readable mediums. Examples of the processor and/or computer readable mediums include a Read-Only Memory (ROM), a Random-Access Memory (RAM), a Compact Disc (CD)-ROMs, magnetic tapes, floppy disks, and optical data storage devices. The processor and/or computer readable mediums may be non-volatile, and may also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While it has been described that a connector is an 11-pin connector in the present disclosure, the connector is not limited to the specific number of pins. Thus the connector may be an 18-pin, 22-pin, or any suitable number of pins connector. In another example, while it has been described that a portable terminal recognizes a first external device supporting MHL connectivity and USB connectivity, the first external device is not limited to the specific connection schemes. Thus the first external device may support a connection scheme other than MHL connectivity and USB connectivity. Further, it has been described in the present disclosure that the portable terminal receives a USB connection message via a CBUS line being a cable line from the external device. However, communication between the portable terminal and the external device is not limited to wired communication. Thus, the portable terminal may transmit a USB connection message or receive a USB connection response message in a radio frequency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus comprising:
a connector connected to an external device; and
a controller configured to:
determine whether a portable terminal is connected to the external device,
transmit a connection message, if it is determined that the portable terminal is connected to the external device through the connector, the connection message asking whether the external device supports a second connection scheme, to the external device by using a first connection scheme,
receive a connection response message from the external device in response to the connection message,
determine, based on the connection response message, whether the external device supports the second connection scheme, and
recognize at least one device supporting the second connection scheme in the external device by activating the second connection scheme, if the external device supports the second connection scheme.

2. The apparatus of claim 1, wherein the first connection scheme is Mobile High-Definition Link (MHL) connectivity and the second connection scheme is Universal Serial Bus (USB) connectivity.

3. The apparatus of claim 2, wherein the connector includes a MHL Data Plus (DP) line, a MHL Data Minus (DM) line, a USB DP line, a USB DM line, and a Control BUS (CBUS) line.

4. The apparatus of claim 2, wherein the controller transmits the connection message and receives the connection response message via a Control BUS (CBUS) line of the connector.

5. The apparatus of claim 2, wherein the controller recognizes at least one USB device of the external device by executing a USB host function.

6. An apparatus for recognizing an external device in a portable terminal, the apparatus comprising:
a connector connected to the external device; and
a controller configured to:
determine whether the portable terminal is connected to the external device;
transmit a connection message, if it is determined that the portable terminal is connected to the external device through the connector, the connection message asking whether the external device supports Universal Serial Bus (USB) connectivity to the external device by using Mobile High-Definition Link (MHL) connectivity via a Control BUS (CBUS) line of the connector,
receive a connection response message from the external device in response to the connection message via the CBUS line,
determine, based on the connection response message, whether the external device supports USB connectivity, and recognize at least one USB device of the external device by executing a USB host function, if the external device supports USB connectivity.

7. An apparatus for recognizing a portable terminal in an external device, the apparatus comprising:
- a connector connected to the portable device; and
- a controller configured to:
  - receive a connection message from the portable terminal by using a first connection scheme, if it is determined that the external device is connected to the portable terminal through the connector, the connection message asking whether the external device supports a second connection scheme,
  - generate a connection response message indicating whether the external device supports the second connection scheme in response to the connection message, and
  - transmit the connection response message to the portable terminal by using the first connection scheme.

8. The apparatus of claim 7, wherein the first connection scheme is Mobile High-Definition Link (MHL) connectivity and the second connection scheme is Universal Serial Bus (USB) connectivity.

9. The apparatus of claim 8, wherein the controller receives the connection message and transmits the connection response message via a Control BUS (CBUS) line of the connector.

10. An apparatus for recognizing a portable terminal in an external device, the apparatus comprising:
- a connector connected to the portable device; and
- a controller configured to:
  - receive a connection message from the portable terminal by using Mobile High-Definition Link (MHL) connectivity via a Control BUS (CBUS) line of the connector, if it is determined that the external device is connected to the portable terminal through the connector, the connection message asking whether the external device supports Universal Serial Bus (USB) connectivity,
  - generate a connection response message indicating whether the external device supports USB connectivity in response to the connection message, and
  - transmit the connection response message to the portable terminal via the CBUS line.

11. A method of recognizing an external device in a portable terminal, the method comprising:
- determining whether the portable terminal is connected to the external device;
- transmitting, if it is determined that the portable terminal is connected to the external device through a connector, a connection message asking whether the external device supports a second connection scheme to the external device by using a first connection scheme;
- receiving a connection response message in response to the connection message from the external device;
- determining, based on the connection response message, whether the external device supports the second connection scheme; and
- recognizing at least one device supporting the second connection scheme in the external device by activating the second connection scheme, if the external device supports the second connection scheme.

12. The method of claim 11, wherein the first connection scheme is Mobile High-Definition Link (MHL) connectivity and the second connection scheme is Universal Serial Bus (USB) connectivity.

13. The method of claim 12, wherein the connection message is at least one of transmitted and received via a Control BUS (CBUS) line of the connector.

14. The method of claim 12, wherein the recognizing of the at least one device supporting the second connection scheme comprises recognizing at least one USB device of the external device by executing a USB host function.

15. A method of recognizing an external device in a portable terminal, the method comprising:
- determining whether the portable terminal is connected to the external device;
- transmitting, if it is determined that the portable terminal is connected to the external device through a connector, a connection message asking whether the external device supports Universal Serial Bus (USB) connectivity to the external device by using Mobile High-Definition Link (MHL) connectivity via a Control BUS (CBUS) line of the connector;
- receiving a connection response message in response to the connection message from the external device via the CBUS line;
- determining, based on the connection response message, whether the external device supports USB connectivity; and
- recognizing at least one USB device of the external device by executing a USB host function, if the external device supports USB connectivity.

16. A method of recognizing a portable terminal in an external device, the method comprising:
- receiving, if it is determined that the external device is connected to the portable terminal through a connector, a connection message asking whether the external device supports a second connection scheme from the portable terminal by using a first connection scheme;
- generating a connection response message indicating whether the external device supports the second connection scheme in response to the connection message; and
- transmitting the connection response message to the portable terminal by using the first connection scheme.

17. The method of claim 16, wherein the first connection scheme is Mobile High-Definition Link (MHL) connectivity and the second connection scheme is Universal Serial Bus (USB) connectivity.

18. The method of claim 17, wherein the connection message is at least one of received and transmitted via a Control BUS (CBUS) line of the connector.

19. A method of recognizing a portable terminal in an external device, the method comprising:
- receiving, if it is determined that the external device is connected to the portable terminal through a connector, a connection message asking whether the external device supports Universal Serial Bus (USB) connectivity from the portable terminal by using Mobile High-Definition Link (MHL) connectivity via a Control BUS (CBUS) line of the connector;
- generating a connection response message indicating whether the external device supports USB connectivity in response to the connection message; and
- transmitting the connection response message to the portable terminal via the CBUS line.

* * * * *